(12) United States Patent
Houston et al.

(10) Patent No.: US 6,442,497 B1
(45) Date of Patent: Aug. 27, 2002

(54) CALIBRATION METHOD AND STRIP FOR FILM SCANNERS IN DIGITAL PHOTOFINISHING SYSTEMS

(75) Inventors: Geoffrey D. Houston, Honeoye Falls; Jacquelyn S. Ellinwood; Samuel Segui, both of Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/549,901

(22) Filed: Apr. 14, 2000

(51) Int. Cl.$^7$ ................................................ B41B 15/00
(52) U.S. Cl. ..................... 702/107; 358/504; 399/49
(58) Field of Search .................. 358/504, 1.1, 518, 358/406; 399/49, 74; 702/107; 356/402

(56) References Cited

U.S. PATENT DOCUMENTS

| | | | |
|---|---|---|---|
| 5,134,573 A | | 7/1992 | Goodwin |
| 5,818,960 A | * | 10/1998 | Gregory et al. ............. 345/442 |
| 5,959,720 A | | 9/1999 | Kwon et al. |
| 6,018,381 A | * | 1/2000 | Vanderbrook et al. ......... 355/38 |
| 6,141,120 A | * | 10/2000 | Falk ............................ 358/504 |
| 6,141,464 A | * | 10/2000 | Handley ..................... 382/287 |
| 6,191,867 B1 | * | 2/2001 | Shor et al. .................... 358/1.9 |
| 6,223,585 B1 | * | 5/2001 | Krogstad .................... 73/32 R |
| 6,284,445 B1 | * | 9/2001 | Keech et al. ................ 430/359 |
| 6,327,047 B1 | * | 12/2001 | Motamed ................... 358/1.15 |

\* cited by examiner

Primary Examiner—Patrick Assouad
(74) Attorney, Agent, or Firm—Thomas H. Close

(57) ABSTRACT

A method of calibrating a scanner in a digital photofinishing system, including the steps of: providing a calibration strip having a series of calibration patches including a plurality of neutral and colored patches, and including a Dmin patch; providing reference printing density values for each of the patches on the calibration strip; scanning the calibration strip in the scanner to produce scanner densities for each patch; and performing a regression on the scanner densities and the reference printing densities to produce a calibration matrix for converting from scanner density to printing density.

6 Claims, 3 Drawing Sheets

CALIBRATION METHOD AND STRIP FOR FILM SCANNERS IN DIGITAL PHOTOFINISHING SYSTEMS

FIELD OF THE INVENTION

The present invention relates to calibration techniques for film scanners, and more particularly to a technique using a calibration strip.

BACKGROUND OF THE INVENTION

Digital Photofinishing provides the capability to improve images beyond what is possible in Optical Photofinishing. One improvement is increasing the gamma in the underexposed regions of customer negatives, to restore the final print to an appearance similar to that of a normally exposed negative. This improvement is called FUGC (Far Under Gamma Correction) and is described in U.S. Pat. No. 5,134,573 issued Jul. 28, 1992 to Goodwin, entitled "Method to Extend the Linear Range of Images Captured on Film." Another improvement is to alter distribution of pixels across the lightness range of the print in a way that provides improved shadow and highlight detail. A number of technologies have been created to perform this task both separately and in combination. FUGC and Contrast Normalization are described in U. S. application Ser. No. 09/086,333, now U.S. Pat. No. 6,233,069, filed May 28, 1998, by Buhr et al., entitled "Digital Photofinishing System Including Film Under Exposure Gamma, Scene Balance, Contrast Normalization, and Image Sharpening Ditital Image Processing" and U.S. Ser. No. 09/086,146, now U.S. Pat. No. 6,097,471, filed May 28, 1998, allowed Mar. 21, 2000, by Buhr et al., entitled "Digital Photofinishing System Including Film Under-Exposure Gamma, Scene Balance, and Image Sharpening Digital Image Processing." Both of these technologies depend on the ability of the scanner to provide accurate printing density values for each pixel.

These technologies also require that the scene balance is estimated accurately and this is accomplished by the Single Channel Printing Algorithm (SCPA) which is described in U.S. Pat. No. 5,959,720, issued Sep. 28, 1999 to Kwon et al., entitled "Method for Color Balance Determination."

Both SCPA and FUGC depend especially on the scanner estimate of film minimum density (Dmin) expressed as printing density. The scanner observes areas outside of the image areas, where no exposure has taken place, and provides these values as measured Dmin. SCPA attempts to estimate a gray point for each frame in an order. It uses this measured Dmin to estimate the saturation of frames and selects frames to exclude from its calculation of gray. It also includes this measured Dmin as part of the formula for estimation of gray. So it can be seen that all of the tone scaling which is done by other algorithms, depends on the estimation of the scene gray point which in turn depends on the accuracy of measured Dmin provided by the scanner. FUGC increases the contrast in shadows by shifting the measured Dmin and applying a lookup table to increase the contrast of the shadows then shifting back to the original measured Dmin. As the contrast of shadows is increased, errors in measured Dmin are amplified in a way that can cause unnaturally colored shadows or dark subject areas in prints.

To assure that the improvements embodied in Digital Photofinishing are delivered faithfully and without artifacts or color errors, it is critical for the scanner to provide accurate printing density measurements of film Dmin. Film scanners in current Digital Photofinishing Systems are calibrated by measuring the scanner densities of the frames of a 17 patch calibration strip. These patches are exposed uniformly and include a series of 5 neutral patches and 12 colored patches. The intent in this original design is to present to the scanner, a range of densities representing 95% of the Large Area Transmission Densities of consumer color negatives. Currently used calibration strips do not contain a Dmin patch. Presumably this was omitted in the 17 patch calibration strip because it contains no pictorial information and was not important for optical printing algorithms.

For each of the 17 patches (i=1–17), the Red Aim Printing Density $A_{ri}$ is calculated. $A_{ri}$=Red Reference Printing Density of the $i^{th}$ patch where $$\text{Red Reference Printing Density} = -\text{Log}\frac{\int_{\lambda 1}^{\lambda 2} P_\lambda \cdot T_\lambda \cdot S_\lambda^r \, d\lambda}{\int_{\lambda 1}^{\lambda 2} P_\lambda \cdot S_\lambda^r \, d\lambda} \quad (1)$$

and $S^r_\lambda$=Kodak Edge 7 Paper Spectral Sensitivity for the red record;

P=Printer Light Source (average of Kodak subtractive printers)

T=Film Transmittance of the $i^{th}$ patch measured on spectrophotometer $\lambda$=Wavelength The green and blue Aim Printing Densities are calculated in a similar fashion using the corresponding Kodak Edge 7 Paper Spectral Sensitivities for the green and blue records.

The measured red, green and blue scanner densities $S_r$, $S_g$ and $S_b$ of all 17 patches are linearly regressed against the aim red, green and blue densities of all the patches so as to minimize the errors in the summation:

$$\text{Error Sum of Squares} = \Sigma_i\{(S_{ri}-A_{ri})^2 + (S_{gi}-A_{gi})^2 + (S_{bi}-A_{bi})^2\} \quad (2)$$

The resulting 3×4 Calibration Matrix M provides a conversion from Scanner Densities S to Printing Densities P using Equation 3.

$$P_r = (m_{11} \times S_r + m_{12} \times S_g + m_{13} \times S_b + m_{14r})$$

$$P_g = (m_{21} \times S_r + m_{22} \times S_g + m_{23} \times S_b + m_{24r})$$

$$P_b = (m_{11} \times S_r + m_{32} \times S_g + m_{33} \times S_b + m_{34r}) \quad (3)$$

The range of densities over which accurate printing densities are provided by the scanners after calibration is limited by the range of densities in the 17 patches. Dmin values are determined by extrapolation from the calibrated range of densities on the calibration strip. This extrapolation can result in errors in measured Dmin, which as noted above will adversely affect the performance of digital image processing algorithms such as FUGC and SCPA.

There is a need therefore for an improved technique of scanner calibration that avoids this problem.

SUMMARY OF THE INVENTION

The need is met according to the present invention by providing a method of calibrating a scanner in a digital photofinishing system that includes the steps of: providing a calibration strip having a series of calibration patches including a plurality of neutral and colored patches, and including a Dmin patch; providing reference printing density values for each of the patches on the calibration strip; scanning the calibration strip in the scanner to produce scanner densities for each patch; and performing a regression on the scanner densities and the reference printing densities to produce a calibration matrix for converting from scanner density to printing density.

The calibration method with the strip having a Dmin patch embodied in this invention delivers improved Dmin accuracy without reducing accuracy in other densities. A further advantage is that the improved technique is compatible with the current technique, requiring only a software change in the program that drives the sensitometer to produce the calibration strip. No modification whatever is required in the scanners to use the improved strip. The method of the present invention employing the calibration strip with a Dmin patch produces enhanced image quality in the form of improved color consistency especially in enhanced prints from under-exposed negative.

DETAILED DESCRIPTION OF THE INVENTION

Figure 1:
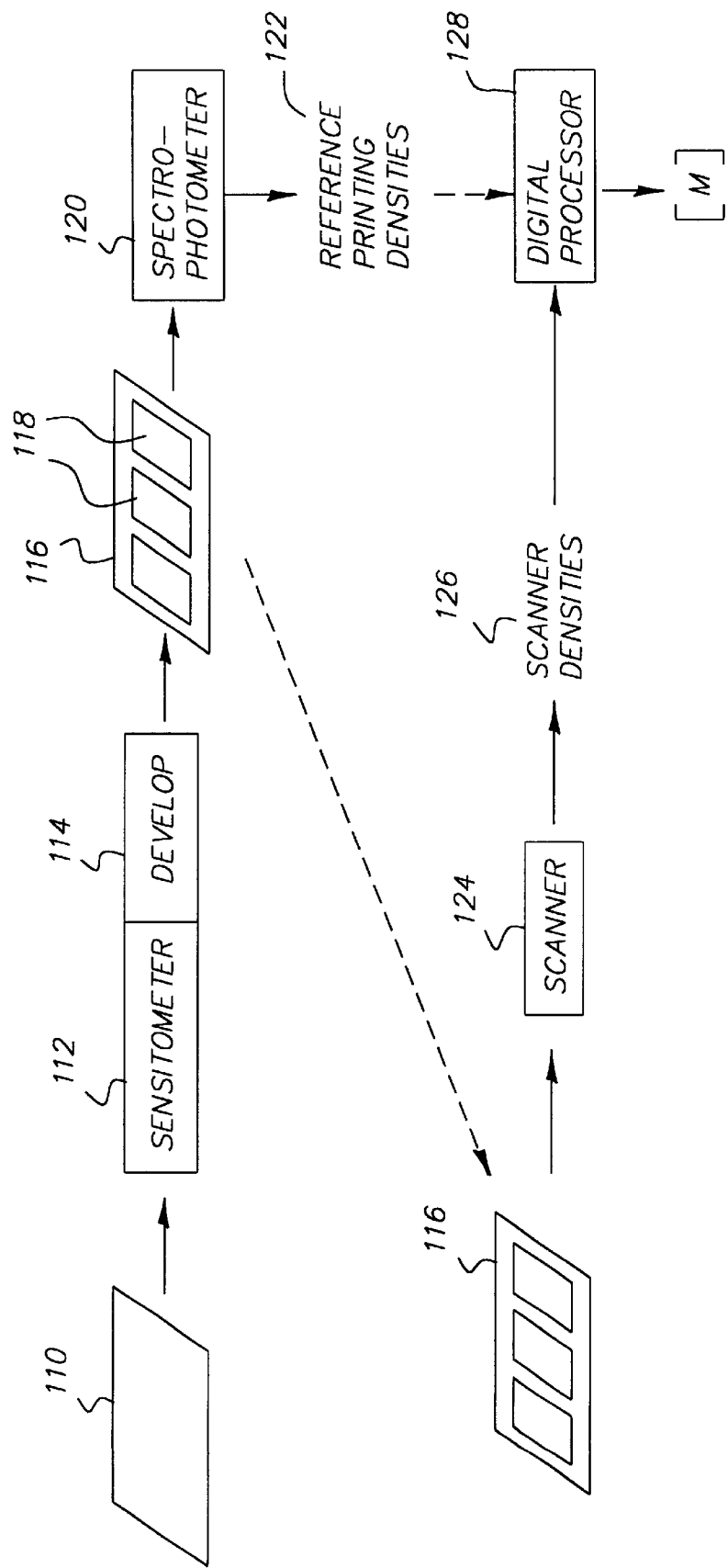
FIG. 1 is a schematic block diagram showing the prior art calibration strip production and scanner calibration.

Referring to FIG. 1, as is currently practiced in the art, a calibration strip is produced by exposing a strip of representative photographic film 110 (e.g. Kodak Advantix 200-2) in a sensitometer 112 that is designed for the purpose of producing calibration strips. The exposed photographic film 110 is developed in a film processor 114 using a standard development process (e.g. C-41) to produce a calibration strip 116 having plurality of patches 118. The calibration strip 116 is scanned in a spectro-photometer 120 to produce transmission values at every wavelength for each patch 118. The transmission values are used to calculate a set of reference printing densities 122 as shown in equation 3.

The calibration strip 116 and the reference printing densities 122 are sent to a photofinishing laboratory having a film scanner 124. The calibration patches 118 on the calibration strip 116 are scanned in the film scanner 124 to produce a set of scanner densities 126. The scanner densities 126 and the reference printing densities 122 are regressed in a digital computer 128 to produce the scanner calibration matrix M.

Figure 2:
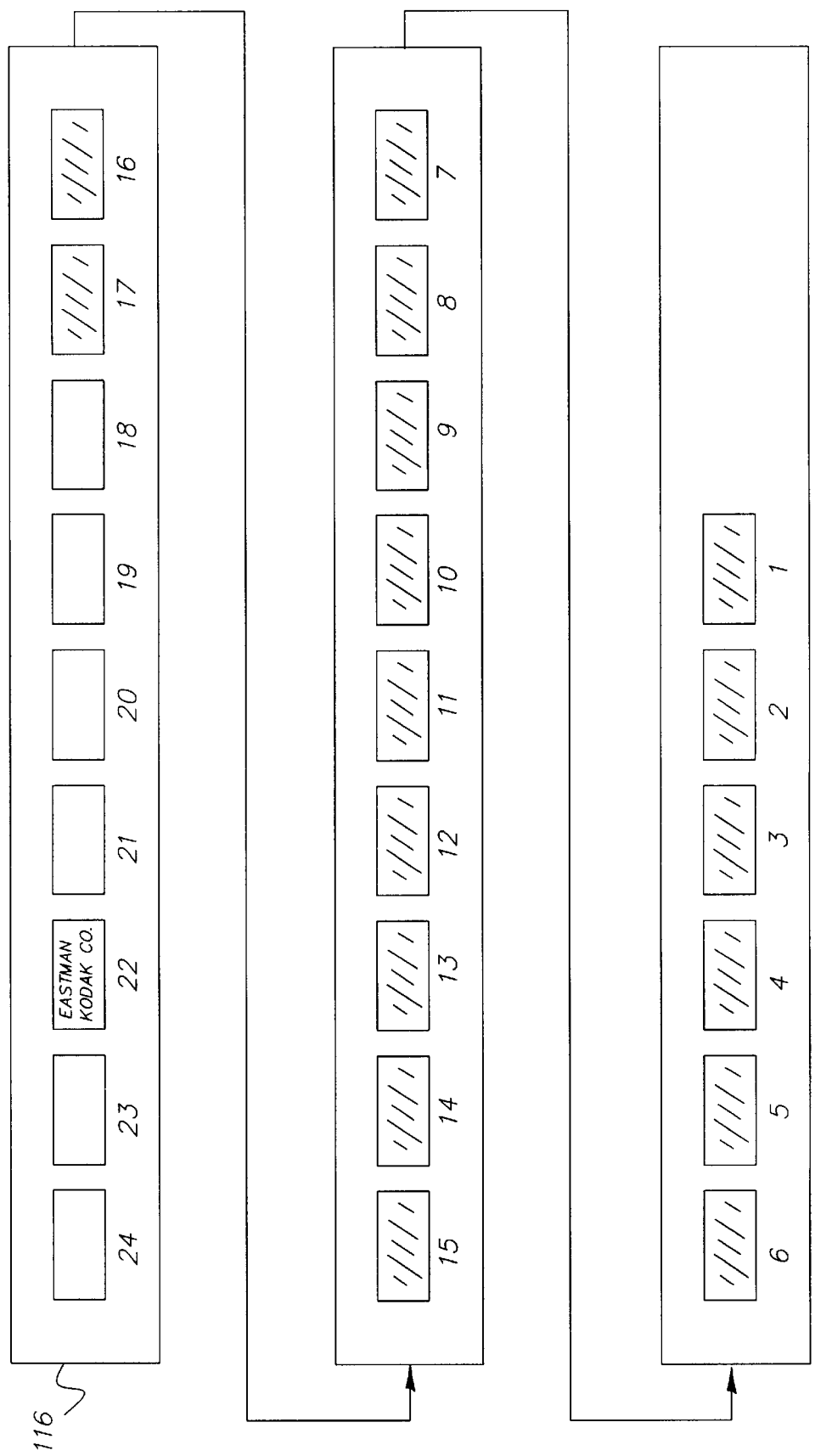
FIG. 2 shows a calibration strip according to the prior art.

Referring to FIG. 2, the format of a scanner calibration strip 116 currently used by the Eastman Kodak Company is shown. The calibration strip 116 includes a plurality of identification frames (18–24), a plurality of color patches numbered 1, 2, 4, 5, 7, 8, 10, 11, 13, 14, 16 and 17 and a plurality of neutral patches numbered 3, 6, 9, 12, and 15.

Figure 3:
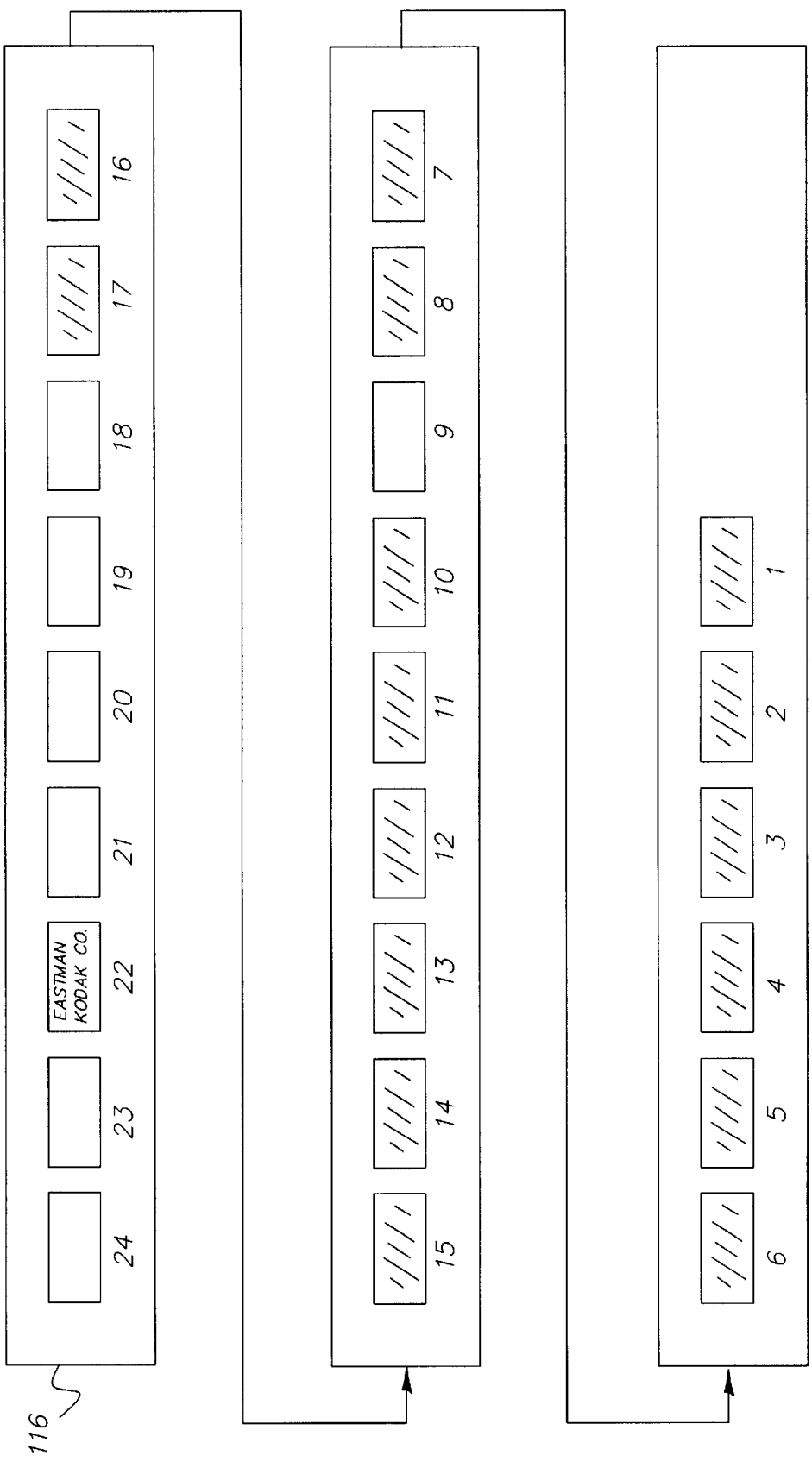
FIG. 3 shows a calibration strip according to the present invention.

Referring to FIG. 3, a preferred embodiment of a scanner calibration strip 116 according to the present invention is shown. According to the present invention, one of the patches (patch number 9) is a Dmin patch, produced in the sensitometer 112 by not exposing a portion of the film.

This improved calibration patch is employed in the current system, without modifying any of the software or hardware of the system. By including a Dmin patch in the calibration strip, the scanner is calibrated for actual Dmin so no extrapolation is required, thereby reducing the possibility of error in Dmin calibration.

Tests of the improved strip have shown that errors in printing densities of Dmins of 14 different films are reduced by an average of ½ color button (0.01 printing density). This is accomplished without changing the errors at other densities. The new strip can be used in existing scanners without changing software or operating procedures.

The invention has been described in detail with particular reference to certain preferred embodiments thereof, but it will be understood that variations and modifications can be effected within the spirit and scope of the invention.

PARTS LIST

1–24 calibration strip frames
110 photographic film strip
112 sensitometer
114 film processor
116 calibration strip
118 patches on calibration strip
120 spectro-photometer
122 reference printing densities
124 film scanner
126 scanner densities
128 digital computer

What is claimed is:

1. A method of calibrating a scanner in a digital photofinishing system, comprising the steps of:
    a) providing a calibration strip having a series of calibration patches including a plurality of neutral and colored patches, and including a Dmin patch;
    b) providing reference printing density values for each of the patches on the calibration strip;
    c) scanning the calibration strip in the scanner to produce scanner densities for each patch; and
    d) performing a regression on the scanner densities and the reference printing densities to produce a calibration matrix for converting from scanner density to printing density.

2. The method claimed in claim 1, wherein the calibration strip includes 4 neutral patches, 12 colored patches, and the Dmin patch.

3. The method claimed in claim 1, wherein the calibration strip further comprises one or more identification frames.

4. The method claimed in claim 3, wherein the calibration strip is APS format film.

5. The method claimed in claim 1, wherein the calibration strip is a strip of photographic film that is exposed in a sensitometer and the Dmin patch is formed by not exposing a portion of the a film.

6. The method claimed in claim 1, wherein the calibration matrix is a 3×4 matrix.

* * * * *